United States Patent [19]

Matsumoto et al.

[11] 3,761,586

[45] Sept. 25, 1973

[54] HEMOSTATIC AGENT AND THE PROCESS OF PREPARING SAME

[75] Inventors: Yoshito Matsumoto, Tokyo; Kenji Koyama, Saitama; Yasuko Takeda, Chiba, all of Japan

[73] Assignee: Chugai Seiyaku Kabushiki Kaisha, Tokyo, Japan

[22] Filed: Mar. 2, 1971

[21] Appl. No.: 120,302

Related U.S. Application Data

[63] Continuation-in-part of Ser. No. 836,936, June 26, 1969, abandoned.

[30] Foreign Application Priority Data

June 26, 1968 Japan.............................. 43/43936
Aug. 6, 1968 Japan.............................. 43/55284

[52] U.S. Cl. .................................................. 424/98
[51] Int. Cl............................................ A61k 17/00
[58] Field of Search ........................................ 424/98

[56] References Cited
OTHER PUBLICATIONS

Yoshikura et al., "Chem. Abstracts," Vol. 66 (1967), p. 1121b
Minton, "Chem. Abstracts," Vol. 69 (1968), p. 104787c
Kimura et al., "Chem. Abstracts," Vol. 61 (1964), p. 8671c

*Primary Examiner*—Albert T. Meyers
*Assistant Examiner*—Vincent D. Turner
*Attorney*—Browdy and Neimark

[57] ABSTRACT

The hemostatic agent of the present invention is obtained by the following process: An aqueous solution of *Trimeresurus okinavensis* venom is treated with almost the same volume of an organic solvent such as chloroform, ether and ethyl acetate to remove lipids, and the water layer is collected and dialysed against a distilled water. Dyalysate is passed through dextran gel column, said dextran gel having a molecular weight fractionation range of 1,000 to 50,000, to adsorb thereon and eluted with phosphate buffered solution (pH 7 – 8). The fraction having strong coagulating activity is collected in the recalcification test and passed through a column filled with a basic ion exchange resin to allow the active substance to adsorb thereon and eluted with ethyl acetate (pH about 7). The fraction having the highest blood coagulating activity is collected in the recalcification test, and lyophilised.

4 Claims, No Drawings

HEMOSTATIC AGENT AND THE PROCESS OF PREPARING SAME

This is a continuation-in-part application of copending Pat. application Ser. No. 836,936, filed June 26, 1969, now abandoned.

This invention relates to a hemostatic agent and the process of preparing the same from the venom of *Trimeresurus okinavensis*, commonly known as "Himehabu."

It has now been unexpectedly found, on investigating "Himehabu" venom, that the substance which is obtained by a certain treatment of the venom has strong hemostatic activity, and that such hemostatic substance may be satisfactorily clinically used.

The following detailed description of a specific embodiment will so fully reveal the general nature of the invention that others can, by applying current knowledge, readily modify and/or adapt it for various applications without departing from the generic concept.

The hemostatic agent of the present invention is obtained by treating an aqueous solution of *Trimeresurus okinavensis* venom with almost the same amount of an organic solvent such as chloroform, ether or ethyl acetate to remove lipids, collecting the water layer and dialysing it against distilled water; passing the dialysate through dextran gel column, said dextran gel having a molecular weight fractionation range of 1,000 to 50,000, to allow the active substance to adsorb thereon, carrying out elution with phosphate buffered solution (pH 7 - 8), collecting the fraction having strong coagulating activity in the recalcification test; and passing the fraction through a column filled with a basic ion exchange resin such as diethylaminoethylcellulose (DEAE-cellulose), triethylaminoethylcellulose (TEAE-cellulose) and diethylaminoethyl-sephadex (DEAE-Sephadex; Sephadex is a trademark for a hydrophilic insoluble molecular sieve made up of modified dextran chains with diethylaminoethyl groups attached to the glucose units by ether linkages); to allow the active substance to adsorb thereon, carrying out elution with sodium acetate buffer (pH about 7), collecting the fraction having the highest blood coagulating activity in the recalcification test, and lyophilysing the fraction.

The process of this invention is schematically shown in the following table to explain in more detail.

In the preferred operation the crude venom is first dissolved in a distilled water, the pH of which is previously adjusted to 7.0 with an alkali and the solution is subjected to extraction several times with an equivalent volume of an organic solvent, for example chloroform, ether or ethylacetate, followed by centrifugation.

As lipids of the venom transfer into the organic solvent layer in this extraction step, only the water layer (F—I—A) is taken out and dialyzed against a distilled water to give the dialysate (F—I—B). In this step, loss of the active substance may be effectively prevented if organic solvent layer which lipids transfer into and intermediate precipitate are mixed and shaken with a small amount of distilled water and the water layer resulting is added to the F—I—A prior to the dialysis.

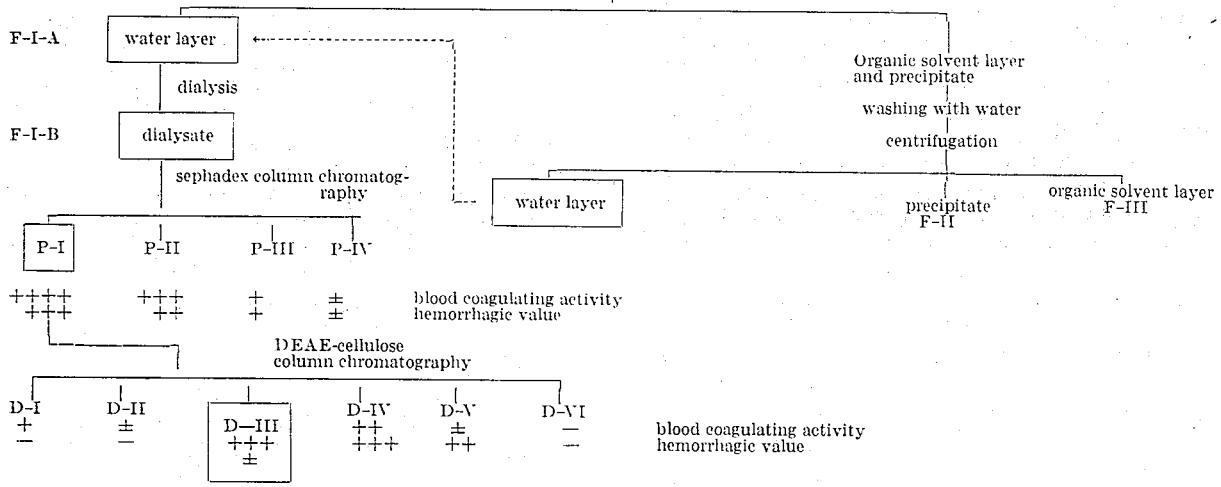

TABLE 1

Precipitate and organic solvent layer given in such mixing and shaking are named F—II and F—III, respectively.

An aqueous crude venom solution and F—I—A show almost the same absorption in 280 mu whereby it appears that most of the proteins transfer into the water layer F—I—A. The dialysate F—I—B shows a little less absorption in 280 mu and it is, therefore, understood that low molecule substance is removed by dialysis.

When the blood coagulation time is determined according to the recalcification time method with rabbit plasma, blood coagulating activities are strongly observed in an aqueous crude venom solution and F—I—A and F—I—B and they are almost the same value, but it is not observed in F—II and F—III. These facts show that the dialysate F—I—B contains most of the hemostatically active substance.

However, because the dialysate thus obtained still contains various harmful components including hemorragic factor, the dialysate is passed through a column, filled with a dextran gel, for example that having a molecular weight fractionation range of 1,000 to 50,000, to allow the active substance to adsorb thereon and carrying out elution with phosphate buffered solution (pH 7 - 8) to give P—I to P—IV fractions. The largest molecular fraction P—I contains much blood coagulating substance; while much hemorrhagic factor still remains in this fraction as well.

The largest molecular fraction P—I is further passed through a column filled with a basic ion exchange resin, for example diethylaminoethyl-cellulose (DEAE-cellulose), triethylaminoethyl-cellulose (TEAE-cellulose) and diethylaminoethylsephadex (DEAE-sephadex; "Sephadex" is a trademark; produced by Pharmacia Fine Chemicals, Uppsala; Sweden) to allow the active substance to adsorb thereon, carrying out elution with sodium acetate buffer (PH about 7) to give D—I to D—VI fractions. The D—III fractions shows the highest blood coagulating activity and contains little hemorrhagic factor.

The active substance thus obtained shows good thrombin-like activity and its blood coagulating activity is more than twice to about 10 times as great as that of known commercial hemostatic agents.

The hemostatically active factor in the agent may be extracted almost in a homogeneous state by a column chromatography of P—I fraction with DEAE-sephadex A—50 (eluting agent: sodium acetate buffer), followed by with Sephadex G—200 (eluting agent: 0.05 M Tris-HCl buffer, pH 7.5, containing 0.1 M KCl).

The extracting procedures are schematically shown in the following Table 2.

TABLE 2

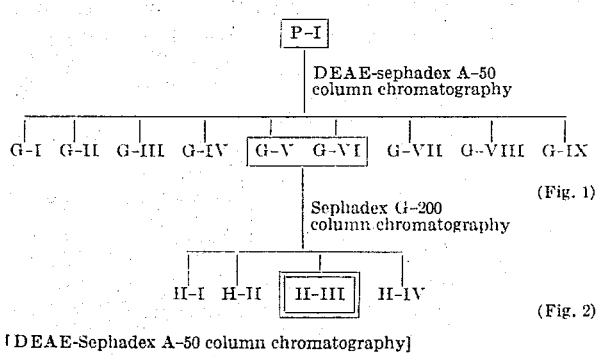

(Fig. 1)

(Fig. 2)

[DEAE-Sephadex A-50 column chromatography]

The P—I fraction is passed through H⁺ form of DEAE-sephadex A—50 and the active substance is eluted with various concentrations of sodium acetate buffer.

G–I and G–II —0.1 - 0.2 N acetate buffer, pH 6.2
G–III, G–IV, G–V and G–VI—Gradient elution from 0.2 N acetate buffer, pH 6.2 to 0.5 N acetate buffer, pH 5.0
G–VII—0.5 N acetate buffer, pH 5.0
G–VIII and G–IX—1.0 N acetate buffer, pH 4.5

The hemostatic activity is observed in G—V and G—VI. (Sephadex G—200 column chromatography)

The G—V and G—VI fractions are combined and passed through Sephadex G—200 column and the active substance is eluted with 0.05 M tris-HCl buffer, pH 7.5 containing 0.1 M KCl. The hemostatic activity is observed in H—III.

The H—III fraction is almost homogenous, though one or two weak bands are still observed together with a main band in electrofocusing method using carrier ampholyte, pH range 3.0 - 6.0 and in disc-electrophoresis method using polyacrylamide gel.

Some of the chemical and physical properties has been estimated as follows:

1. Molecular weight:
   30,000 - 35,000 by a column chromatography using dextran gel (Sephadex G—200).
2. Isoelectric point:
   5.10; by electrofocusing method using carrier ampholyte, pH range 3.0 - 6.0
3. Nucleic acid content:
   Nucleic acids is not observed in diphenyl amine method.
4. UV-absorption:
   Maximum absorption is observed at 277 - 278 mu, and not at 260 mu. This suggests that nucleic acids are not existent. Slight shoulder is observed at 290 mu. Molecular extinction coefficient is still known.
5. Amino acid content:
   Amino acids are analyzed by amino acid autoanalyser (HITACHI-KLA 3 B). Aspartic acid is the most and the next are glycine, glutamic acid and leucine; this fact suggests that the active factor is an acidic protein.
6. Nitrogen content:
   Nitrogen content was determined by Ultramicro analysis using Hitachi 026 CHN Analyzer and found to be 6.35 percent. This suggests that H—III fraction is not a simple protein but a conjugated protein.
7. Homogeneity:
   One or two weak bands are still observed together with a main bands in electrofocusing method using carrier ampholyte, pH range 3.0 - 6.0 and in disc-electrophoresis method using polyacrylamide gel. This suggests that the hemostatic substance is purified in almost homogeneous state, but that it may contain slight impurities in still.

Ultracentrifugal analysis was undertaken using Spinco E-type ultracentrifugator. Sedimentation-velocity experiments revealed apparent one component with $S_{20}$ 2.9 s. But the concentration of H—III fraction used was too low to confirm its homogeneity.

The following example will further clarify without limiting the invention:

Five hundred mg of the lyophilized crude venom of *Trimeresurus okinavensis* was dissolved in 10 ml. of a distilled water, the pH of which was previously adjusted to 7.0 with an alkali, and the solution was subjected to extraction with 10 ml. of chloroform while shaking, followed by centrifugation (3,000 r.p.m. 10–15 minutes). This step was repeated five times and a primary water layer was collected. The chloroform layer and intermediate precipitate were shaken with a small amount of distilled water and centrifuged (3,000 r.p.m. 10–15 minutes). This procedure was repeated twice and the water layers were combined (secondary water layer). The secondary water layer was added to the primary water layer and the mixture was dialyzed over night against a distilled water. The dialysate was then lyophilized.

One hundred and seventy mg. of the product was dissolved in 1 ml. of 1/70 M phosphate buffered solution (pH 7.4) and the solution was passed through a column (size: 2 × 46 cm) filled with a dextran gel having a molecular weight fractionation range of 1,000 to 50,000 ["Sephadex G—75" (trade mark) produced by Pharmacia Fine Chemicals, Uppsala, Sweden] to allow the hemostatic substance to adsorb thereon; the active material was then eluted from the dextran gel with 1/70 M Phosphate buffer solution at a temperature of 21°C. using an eluting speed of 6 ml./hour. Eluate was serially collected in fractionation tubes containing 2 ml/tube and fractions having strong blood coagulating activity in the recalcification test were collected in tube Nos. 25 – 40 and lyophilized. In these fractions the first peak appeared just after void volume by the method of UV-absorption at 280 mu.

In the above, recalcification test was carried out as follows: To 0.01 ml. of rabbit plasma (containing a little amount of citric acid) was added 0.1 ml. of each eluate and 0.1 ml. of 1/40 M $CaCl_2$ solution, and the mixture was kept at 37°C. to determine the clotting time.

Fifty-five mg. of the active product was dissolved in 1 ml. of 0.0005 M sodium acetate buffer solution at a pH of 7.1 and the solution was passed through DEAE-cellulose column (size: 0.9 × 35 cm.) to allow the active substance to adsorb thereon and the active material was eluted with sodium acetate buffer while mole concentration was gradually increasing from 0.005 M to 0.5 M (Gradient elution). Eluate was serially collected in fraction tubes of 3.5 ml/tube and coagulating activity of each fraction was examined in the same manner as above. The fraction eluted with the range of 0.04 – 0.1 M of sodium acetate buffer solution was collected and lyophilyzed.

The final product contains no hemorrhagic factor and no other harmful component and is a hemostatic agent which is used as a hemostatic.

It is to be understood that the invention is not limited to the embodiment disclosed which is illustratively offered and that modifications may be made without departing from the invention.

What is claimed is:

1. A process for preparing a hemostatic agent comprising the step of: treating an aqueous solution of *Trimeresurus okinavensis* venom with an equivalent volume of an organic solvent selected from the group consisting of chloroform, diethyl ether and ethyl acetate to remove lipids and to yield a primary water layer and an organic solvent layer and precipitate; collecting the water layer and dialysing it against distilled water; passing the dialysate through a dextran gel column, said dextran gel having a molecular weight fractionation range of 1,000 to 50,000 to allow the active substance to adsorb thereon; carrying out elution with a phosphate buffered solution, to obtain a first set of fractions; collecting the fraction having a coagulating activity in the recalcification test; passing said fraction through a column containing a basic ion exchange resin selected from the group consisting of diethylaminoethylcellulose triethylaminoethyl-cellulose and a hydrophilic insoluble molecular sieve made up of modified dextran chains with diethylaminoethyl groups attached to the glucose units by ether linkages, to allow the active substance to adsorb thereon; carrying out elution with sodium acetate buffer, to obtain a second set of fractions; collecting that fraction having the highest blood coagulating activity among said second set of fractions and lyophilizing said fraction.

2. The process in accordance with claim 1 further comprising the steps of: mixing and shaking the organic solvent layer and the precipitate from said treatment with distilled water to obtain a water layer, an organic solvent layer and a precipitate and adding said water layer resulting with the said primary water layer prior to said dialysis.

3. The process in accordance with claim 1 wherein the fraction collected before lyophilizing is passed thru a second column containing an ion exchange resin and is eluted with a 0.05 M Tris-HCl buffer, pH 7.5 containing 0.1M KCl to obtain a third set of fractions and those fractions are collected having the highest blood coagulating activity among said third set of fractions.

4. The hemostatic agent produced according to the process of claim 1.

* * * * *